United States Patent
Hakes (10) Patent No.: US 11,325,665 B2
(45) Date of Patent: May 10, 2022

(54) IDLER HEIGHT ADJUSTMENT IN UNDERCARRIAGE SYSTEM USING DISPLACEMENT OF FLOWABLE MATERTAL

(71) Applicant: Caterpillar Inc., Deerfield, IL (US)

(72) Inventor: David Jennings Hakes, Princeville, IL (US)

(73) Assignee: Caterpillar Inc., Peoria, IL (US)

( * ) Notice: Subject to any disclaimer, the term of this patent is extended or adjusted under 35 U.S.C. 154(b) by 270 days.

(21) Appl. No.: 16/537,118

(22) Filed: Aug. 9, 2019

(65) Prior Publication Data

US 2021/0039729 A1 Feb. 11, 2021

(51) Int. Cl.
| | |
|---|---|
| *B62D 55/15* | (2006.01) |
| *B62D 55/084* | (2006.01) |
| *B62D 55/10* | (2006.01) |
| *B62D 55/30* | (2006.01) |

(52) U.S. Cl.
CPC ........... *B62D 55/15* (2013.01); *B62D 55/084* (2013.01); *B62D 55/10* (2013.01); *B62D 55/305* (2013.01)

(58) Field of Classification Search
CPC ...... B62D 55/15; B62D 55/084; B62D 55/10; B62D 55/305; B62D 55/30; B62D 55/112
See application file for complete search history.

(56) References Cited

U.S. PATENT DOCUMENTS

| | | | |
|---|---|---|---|
| 2,468,957 A | 5/1949 | Burks | |
| 3,477,766 A * | 11/1969 | Linsay | B62D 55/30 305/145 |
| 3,787,097 A | 1/1974 | Orr | |
| 3,907,382 A * | 9/1975 | Kessinger, Jr. | B62D 55/30 305/138 |
| 4,120,507 A * | 10/1978 | Miller | B62D 11/20 180/41 |
| 7,100,715 B2 | 9/2006 | Mukaino et al. | |
| 7,237,631 B2 | 7/2007 | Livesay et al. | |
| 8,590,987 B2 | 11/2013 | Angot et al. | |
| 8,870,303 B2 | 10/2014 | Moser | |
| 2008/0265666 A1* | 10/2008 | Livesay | B62D 55/30 305/149 |
| 2014/0284996 A1 | 9/2014 | Necib | |
| 2015/0129329 A1* | 5/2015 | Cox | B62D 55/084 180/9.62 |
| 2016/0236733 A1* | 8/2016 | Tiede | B62D 55/112 |
| 2018/0037281 A1 | 2/2018 | Maier et al. | |
| 2018/0043947 A1* | 2/2018 | Brazier | B62D 55/04 |

FOREIGN PATENT DOCUMENTS

JP 6087172 U 12/1994

* cited by examiner

*Primary Examiner* — Minnah L Seoh
*Assistant Examiner* — Abigail R Hymel
(74) *Attorney, Agent, or Firm* — Brannon Sowers & Cracraft (57) ABSTRACT

An undercarriage system for a track-type machine includes an idler height adjustment system having piston assemblies supported in a frame, in opposition to one another, to contact upper and lower sides of an idler support element or block. A conduit connects the piston assemblies and has therein a fluid exchange valve adjustable to an open position where a flowable material such as grease is exchanged through the conduit between the piston assemblies, and a closed position where fluid connection between the piston assemblies is blocked and idler height is fixed.

20 Claims, 5 Drawing Sheets

IDLER HEIGHT ADJUSTMENT IN UNDERCARRIAGE SYSTEM USING DISPLACEMENT OF FLOWABLE MATERIAL

TECHNICAL FIELD

The present disclosure relates generally to adjusting idler height in an undercarriage system of a track-type machine, and more particularly to an idler height adjustment system where a conduit fluidly connects piston assemblies adjustable to set idler height by exchanging a flowable material.

BACKGROUND

Track-type machines are used in many applications throughout the world such as construction, forestry, landfills, mining, demolition, and in various other environments. In a typical design, an endless loop of coupled together track links is positioned at each side of the machine and extends about a plurality of rotatable track engaging elements. Track-type machines, and the undercarriage system including the tracks in particular, can be subjected to extremely harsh conditions. Side loading, bending loads upon components, twisting loads, impacts, and a variety of other phenomena can lead to track strain, wear, and performance degradation. The materials at a work site, including hard rock materials, sand, clay, landfill trash, and various other materials can intrude between and among components in the track. Motion of components in the undercarriage system in contact with one another tends to wear away material from which the undercarriage components are made, which wear can be accelerated or exacerbated by the worksite materials. As a result, machine tracks and related components are often built with a particular service life in mind, taking advantage of expected wear patterns and wear rates in the basic design of a component.

It is nevertheless typically necessary to service undercarriage systems over the course of a field service life, to tighten or otherwise adjust the track, inspect and replace seals, and perform other basic maintenance. One phenomenon that can require machine downtime relates to addressing idler height changes in response to wearing of undercarriage system components. The idler is a rotatable track engaging element that passively rotates and guides the track as it is driven by way of a drive sprocket. As material is worn away from the idler, from the track, and potentially other components, the position of the idler relative to other components can change. Idler height that is too great can cause track that is advanced around the idler to contact the underlying substrate at a location that is aft of a desired location, whereas when idler height is too low the track can contact the substrate at a location that is further forward than desired. In either case, the ride quality and performance of the machine can be adversely affected.

Various techniques have been proposed over the years to enable the idler height to be adjusted. Shim packs and the like are sometimes provided and carried on board the machine, with individual shims being movable from a position above the idler to a position below the idler as wear of the undercarriage components causes idler height to drift lower over time. Still other techniques involve idler support blocks that have off-center holes for the idler shaft. As idler height changes the support blocks can be repositioned to support the idler shaft at different heights. These and other idler height adjustment strategies can be labor intensive and require breaking the track, necessitating machine downtime.

One known idler height adjustment strategy is set forth in U.S. Pat. No. 7,237,631 to Livesay et al.

SUMMARY OF THE INVENTION

In one aspect, an idler height adjustment system for an idler in an undercarriage system of a track-type machine includes a first piston assembly having a first piston movable between an advanced position and a retracted position, a second piston assembly including a second piston movable between an advanced position and a retracted position, and a frame supporting the first piston assembly and the second piston assembly in opposition to one another for positioning, respectively, above and below an idler support element in the undercarriage. The system further includes a conduit connecting the first piston assembly to the second piston assembly, and a fluid exchange valve within the conduit and adjustable from a closed position, to an open position to exchange a flowable material through the conduit between the first piston assembly and the second piston assembly.

In another aspect, an undercarriage system for a track-type machine includes an idler yoke, and an idler support element coupled to the idler yoke. The system further includes a first piston assembly and a second piston assembly supported, respectively, at an upper location and a lower location relative to the idler support element and in opposition to one another. The system also includes a conduit connecting the first piston assembly to the second piston assembly, and a fluid exchange valve within the conduit and adjustable from a closed position, to an open position to fluidly connect the first piston assembly and the second piston assembly.

In still another aspect, a method of adjusting a height of an idler in an undercarriage system of a track-type machine includes opening a fluid exchange valve in a conduit extended between a first piston assembly supported at an upper side of an idler support element in the undercarriage system, and a second piston assembly supported at a lower side of the idler support element. The method further includes repositioning the idler support element relative to a track roller frame in the undercarriage system while the fluid exchange valve is open, and covarying positions of pistons in the first piston assembly and the second piston assembly based on the repositioning of the idler support element. The method still further includes displacing a flowable material through the conduit based on the covarying of the positions of the pistons, and closing the fluid exchange valve to set a height of the idler after the displacement of the flowable material.

DETAILED DESCRIPTION

Figure 1:
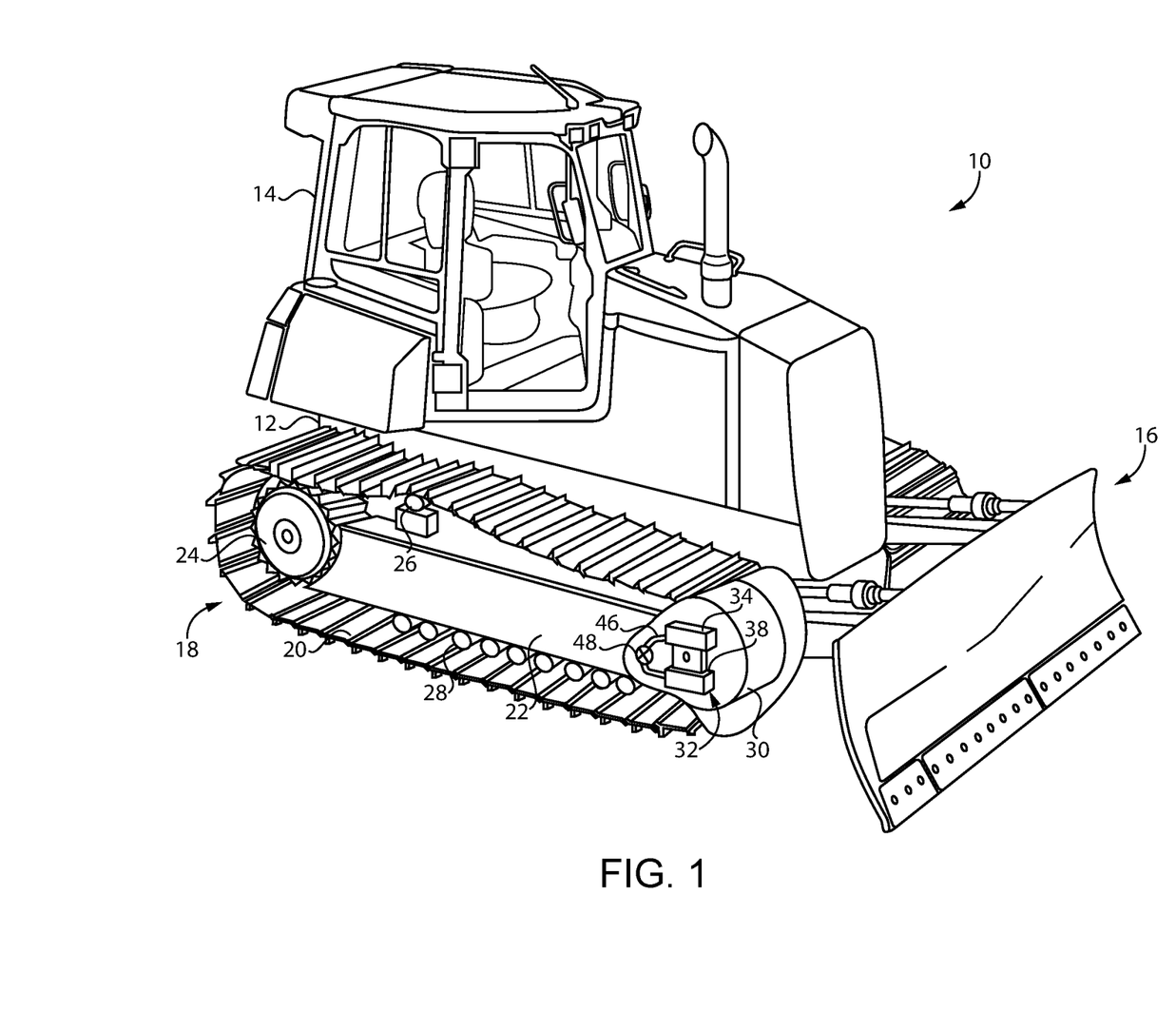
FIG. 1 is a diagrammatic view, partially open, of a track-type machine having an undercarriage system, according to one embodiment.

Referring to FIG. 1, there is shown a track-type machine according to one embodiment, and including a machine frame 12 having a cab 14 mounted thereon. An implement system 16 is supported by frame 12, and an undercarriage system 18 is provided for machine propulsion. Machine 10 is shown in the context of a track-type tractor, however, in other embodiments machine 10 could include a track loader, an excavator, or even a half track machine. Undercarriage system 18 includes a track 20 positioned at a first side of machine 10, and will typically include an identical track at an opposite side of machine 10. Track 20 includes an endless loop of coupled together track links, with track shoes attached to the track links, extending about a plurality of rotatable track engaging elements including a drive sprocket 24, an idler 30, a carrier roller 26, and a plurality of track rollers 28 structured to carry most of the weight of machine 10. Track 20 is shown in an oval track configuration, however, in other embodiments track 20 could be configured with undercarriage system 18 in a so-called high drive configuration. Undercarriage system 18 further includes an idler height adjustment system 32 for idler 30 in undercarriage system 18. Idler height adjustment system 32 (hereinafter "system 32") includes a first piston assembly 34 and a second piston assembly 38, and a conduit 46 connecting first piston assembly 34 to second piston assembly 38. As will be further apparent from the following description, system 32 is uniquely configured for idler height adjustment, such as in response to wear of components in undercarriage system 18, in a fast and efficient manner that does not require breaking track 20.

Figure 2:
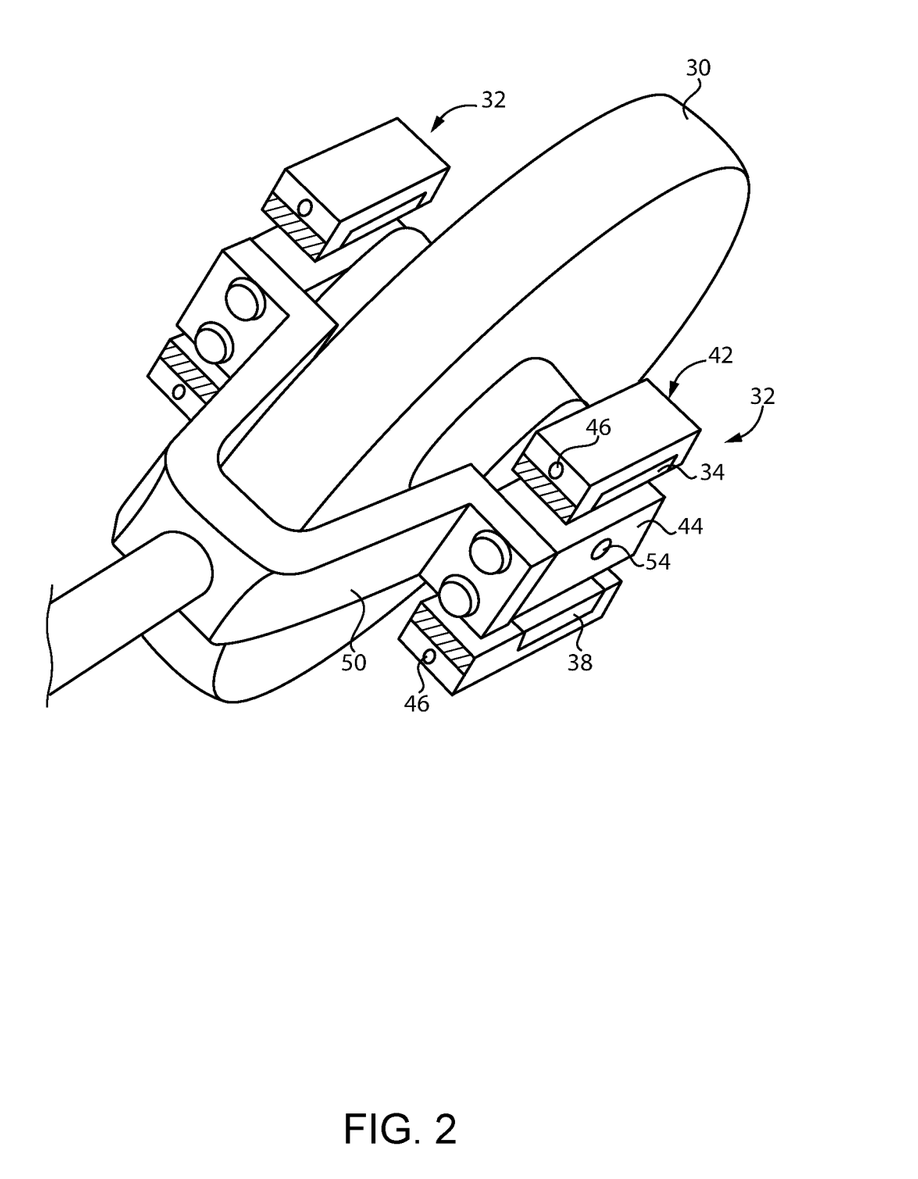
FIG. 2 is a diagrammatic view, in perspective, of an idler height adjustment system, according to one embodiment.
Figure 3:
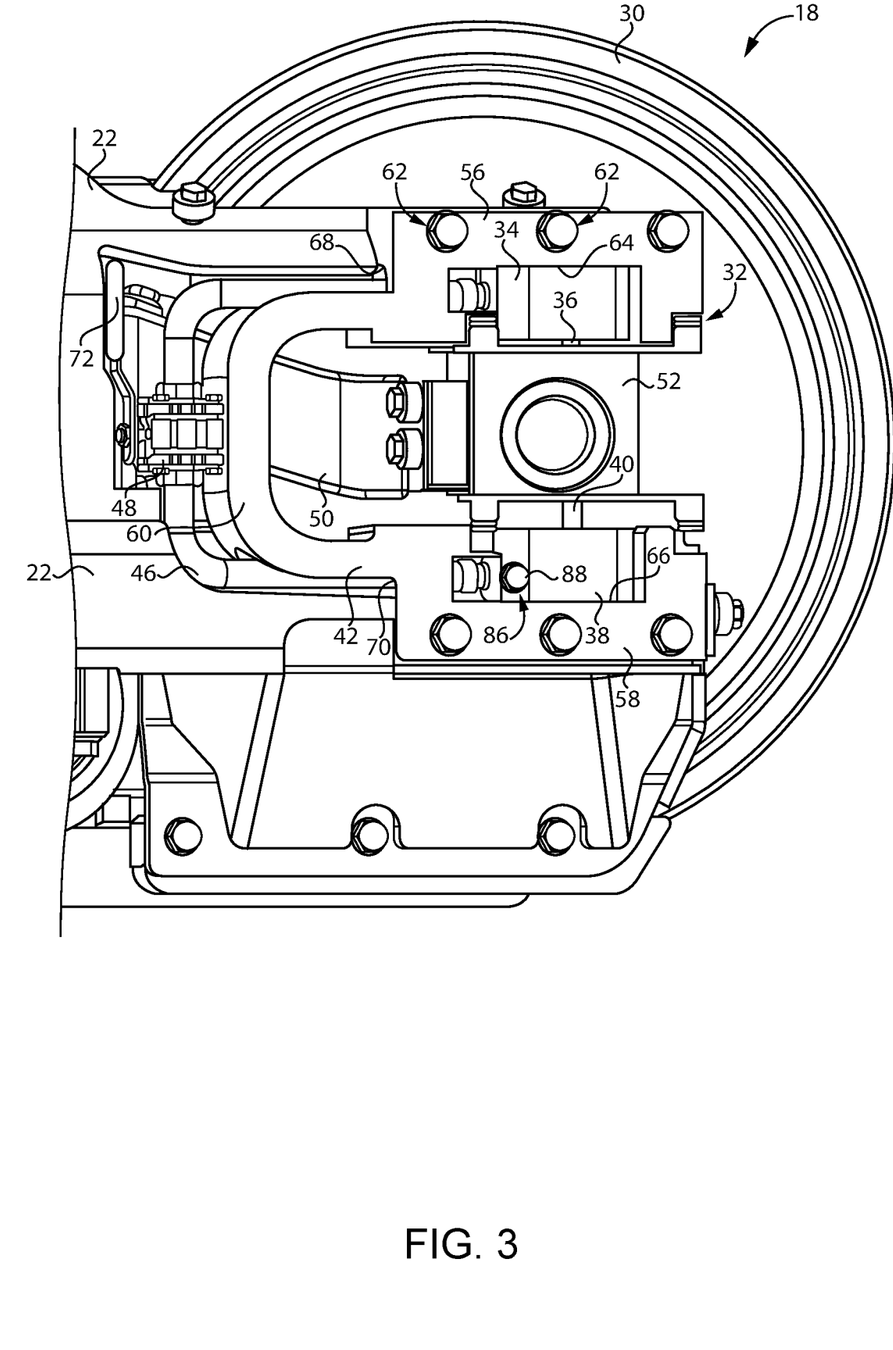
FIG. 3 is a partially sectioned side diagrammatic view of an undercarriage system with an idler positioned at a first height.

Referring also now to FIG. 2 and FIG. 3, first piston assembly 34 includes a first piston 36 movable between an advanced position and a retracted position, and second piston assembly 38 includes a second piston 40 movable between an advanced position and retracted position. System 32 also includes a frame 42 supporting first piston assembly 34 and second piston assembly 36 at an upper location and a lower location, respectively, relative to an idler support element 52. As configured in system 32, first piston assembly 34 and second piston assembly 38 are positioned in opposition to one another, and are above and below idler support element 52 in undercarriage system 18. Idler support element 52 can include an idler support block. An idler yoke 50 is provided, and idler support element 52 is coupled to idler yoke 50 in a generally conventional manner.

In the illustrated embodiment, frame 42 includes a support frame having an upper arm 56 in contact with first piston assembly 34, a lower arm 58 in contact with second piston assembly 38, and a U-bend 60 connecting upper arm 56 and lower arm 58. U-bend 60 can have a generally U-shaped configuration, and a variety of shapes not strictly adherent to a "U" could be functionally and structurally analogous to the configuration depicted in the drawings. Frame 42 has a plurality of bolt holes 62 formed therein, each receiving a bolt, for bolting frame 42 to a track roller frame 22 in undercarriage system 18. It can further be noted that upper arm 56 forms a first receptacle 64 and lower arm 58 forms a second receptacle 66, with first receptacle 64 and second receptacle 66 receiving, respectively, first piston assembly 34 and second piston assembly 38. An idler shaft 54 extends into idler support element 52, with idler yoke 50 generally supporting idler 30 for rotation. Idler yoke 50 could be coupled with an idler recoil system (not shown) such as one or more mechanical springs or gas springs in some embodiments. It will be appreciated that system 32 includes substantially identical, but potentially mirror image, components upon each side of idler 30. In particular, first piston assembly 34 and second piston assembly 38 may be positioned at a first side of track roller frame 22, and a third piston assembly, a fourth piston assembly, and a second conduit connecting the third piston assembly to the fourth piston assembly, may be positioned at a second side of track roller frame 22. Description and discussion herein of components at one side of track roller frame 22, and depicted in side views in FIGS. 3 and 4 should be understood to refer by way of analogy to components at the second side of track roller frame 22. In some instances, the components on either side of track roller frame 22 forming system 32 could be understood as separate and independent systems. In still other embodiments, the components could be integrated into a single system and even a single assembly.

It will be recalled that a conduit 46 connects first piston assembly 34 to second piston assembly 38. A fluid exchange valve 48 is positioned within conduit 46 and adjustable from a closed position, to an open position to exchange a flowable material through conduit 46 between first piston assembly 34 and second piston assembly 38. A second conduit and second fluid exchange valve configured in a like manner may be positioned at the second side of track roller frame 22. In the illustrated embodiment, conduit 46 extends through each of upper arm 56 and lower arm 58 to feed flowable material to and from first piston assembly 34 and second piston assembly 38. In FIG. 3 frame 42 is shown having a bore 68 formed in upper arm 56, and another bore 70 formed in lower arm 58. In other embodiments, conduit 46 could extend around the sides of the structure of frame 42, or otherwise fluidly connect to piston assemblies 34 and 38. Fluid exchange valve 48 is shown positioned approximately in the middle of conduit 46 between first piston assembly 34 and second piston assembly 38. Fluid exchange valve 48 could be positioned at other locations in other embodiments. Also in the illustrated embodiment, fluid exchange valve 48 includes a mechanically actuated valve having an external handle 72. Conduit 46 can be a closed conduit, meaning that conduit 46 does not connect and is not connectable to other fluid circuits in machine 10, such as an on-board hydraulic system. It is contemplated that conduit 46, and other components of system 32, could nevertheless be part of the resident machine hydraulic system.

As noted above, conduit 46 carries a flowable material between first piston assembly 34 and second piston assembly 38. Fluid exchange valve 48 may have a closed position to block fluid connection between first piston assembly 34 and second piston assembly 38, and moved to an open position to fluidly connect first piston assembly 34 and second piston assembly 38, the significance of which will be further apparent from the following description. It should further be understood that exchanging flowable material through conduit 46 between first piston assembly 34 and second piston assembly 38 should not be taken to mean that fluid within one of the piston assemblies necessarily flows all the way to the other one of the piston assemblies when exchange of flowable material occurs. In other words, opening fluid exchange valve 46 can be understood to fluidly connect two sides of system 32, such that flowable material from one side passes to the other side, even if that material is not literally exchanged between the piston assemblies.

In a practical implementation strategy, the flowable material includes a grease filling conduit 46. A grease as contemplated herein will typically be a semisolid or semifluid composition such as that obtained by mixing oil and a thickener such as soap. Oil alone could be used, however, a grease such as a mineral oil grease or a vegetable oil grease provides a practical implementation strategy. System 32 can include a grease port 86 at a location that is fluidly between first piston 36 and second piston 40. A closure 88 blocks grease port 86.

Figure 4:
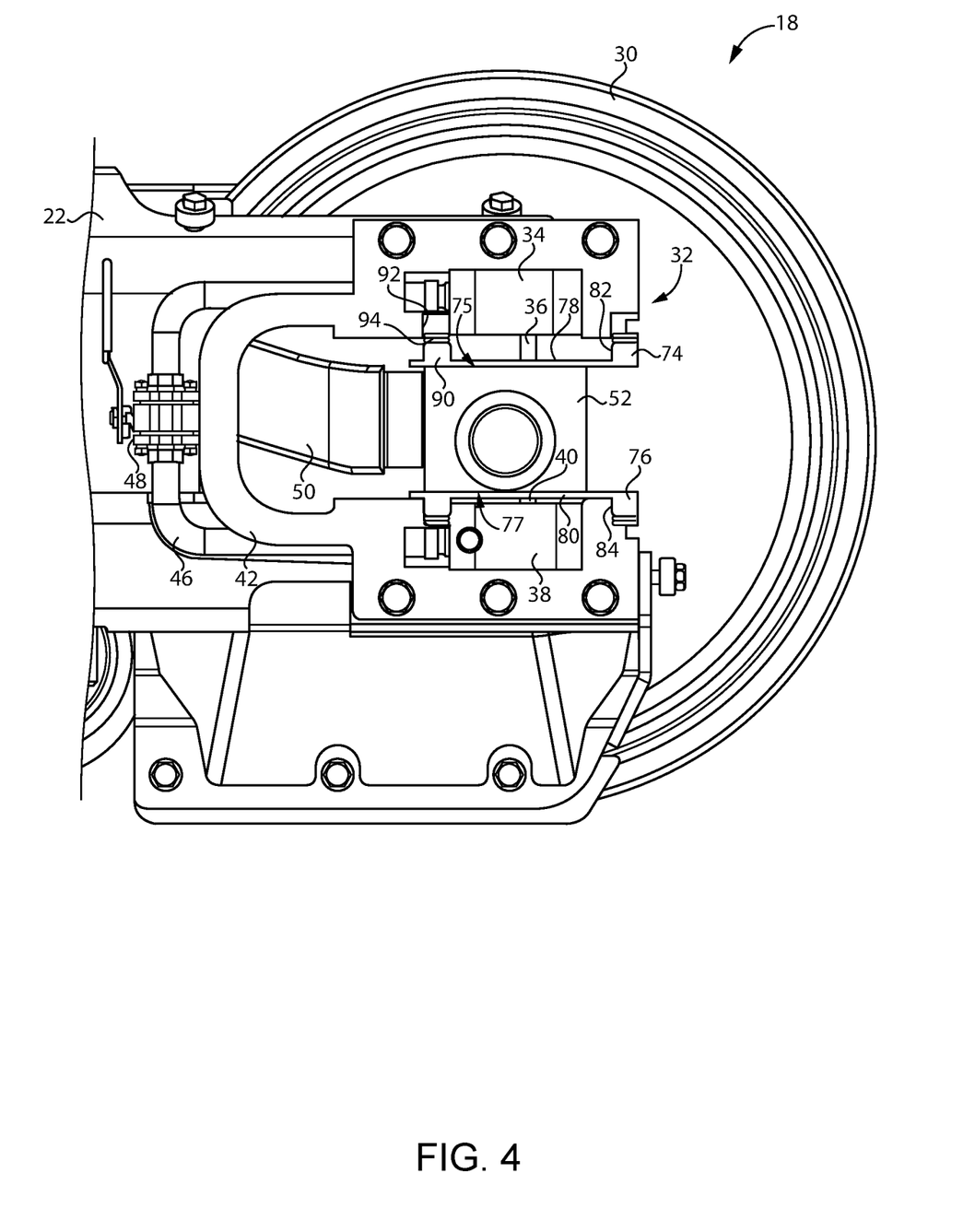
FIG. 4 is a partially sectioned side diagrammatic view of the undercarriage system of FIG. 3 with the idler positioned at a second height.

Referring also to FIG. 4, it will be noted that idler support element 52 is trapped between first piston assembly 34 and second piston assembly 38. System 32 also includes a first block-contact plate 74 abutting first piston 36 and structured to contact an upper side 75 of idler support element, and a second block-contact plate 76 in contact with second piston 40 and structured to contact a lower side 77 of idler support element 52. First block contact plate 74 and second block contact plate 76 may each include a horizontally oriented surface 78 and 80, respectively, in a fixed pattern of contact with the corresponding one of first piston 36 and second piston 40. Each of first block-contact plate 74 and second block-contact plate 76 may also include a vertically oriented guide surface 82 and 84, respectively, having a sliding pattern of contact with frame 42. FIG. 3 depicts idler 30 and system 18 as they might appear where idler support element 52 and idler 30 are fully raised substantially to a maximum idler height. FIG. 4 depicts these components as they might appear fully lowered substantially to a minimum idler height. It can also be seen that block-contact plates 74 and 76 are structured to be guided during moving up and down relative to frame 42. In particular, first block-contact plate 74 is shown configured with a leg 90 that extends generally vertically and is received in a slot 92 formed in frame 42. A pad 94 or the like may be positioned vertically between leg 90 and frame 42. Pad 94 could be provided for cushioning, but could also have a thickness assisting in setting idler height. Accordingly, different pads might be swapped out to vary relative adjustments in idler height that can be obtained using system 18.

INDUSTRIAL APPLICABILITY

Figure 5:
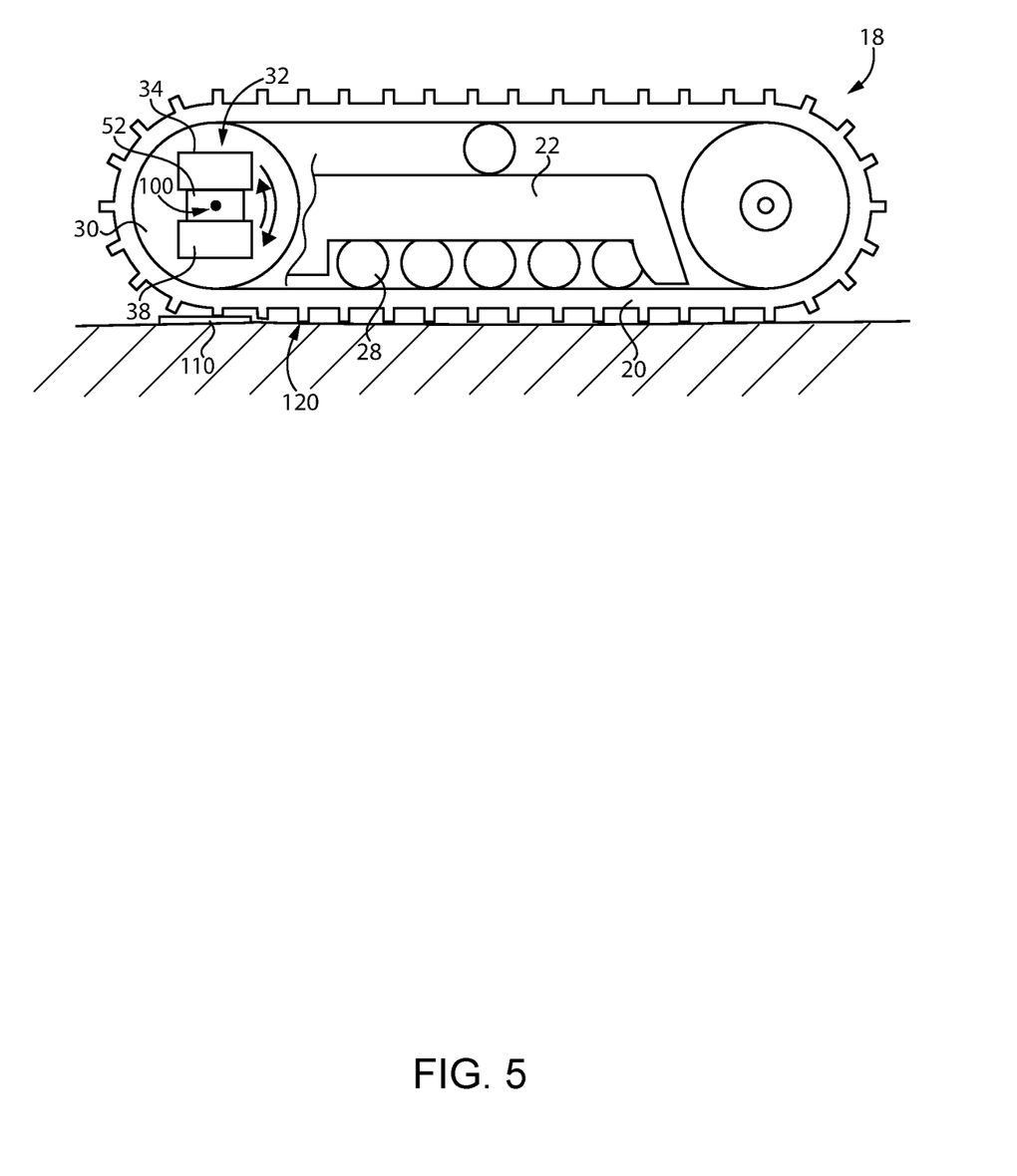
FIG. 5 is a diagrammatic view of an undercarriage system as it might appear positioned for idler height adjustment according to the present disclosure.

Referring to the drawings generally, but also now to FIG. 5, it will be recalled that various known idler height adjustment strategies require breaking the track to allow components to be repositioned, rotated, et cetera. The present disclosure provides a simplified adjustment system having an infinite range of idler heights that can be obtained, in comparison to known strategies using shims, rotation of support blocks, or other strategies. Adjusting a height of idler 30 in undercarriage system 18 according to the present disclosure can include opening fluid exchange valve 48 in conduit 46 to establish fluid connection between first piston assembly 34 and second piston assembly 38. With fluid exchange valve 48 opened, idler support element 52 can be repositioned relative to track roller frame 22. Repositioning idler support element 52 can cause grease to be displaced through conduit 46 between first piston assembly 34 and second piston assembly 38. Because system 32 is generally a closed system, moving one of pistons 36 or 40 will tend to cause the other of pistons 36 and 40 to move in response to the displacement of grease through conduit 46. Positions of pistons 36 and 40 may best be understood as covarying. When piston 36 advances, for example, second piston 40 will retract a like amount due to the fluid communication of motion between first piston assembly 34 and second piston assembly 38. After displacement of grease with fluid exchange valve 48 open, fluid exchange valve 48 can be closed to set a height of idler 30.

With continued reference to FIG. 5, idler height adjustment can be performed by positioning machine 10 on a substantially level and typically hard substrate with a calibration block 110 positioned underneath idler 30 and rested upon a substrate. Machine 10 can be operated to drive under carriage system 18, in particular track 20, on to calibration block 110. With track 20 positioned upon or above calibration block 110, fluid exchange valve 48 can be opened to enable lowering idler support element 52 or lowering track roller frame 22 in undercarriage system 18, toward calibration block 110, under the force of gravity. Also shown in FIG. 5 is a contact point 120, which may be about halfway between an axis of rotation 100 of idler 30 that is located vertically above calibration block 110, and a first track roller 28 in undercarriage system 18. It is generally desirable for grousers of track 20 to contact an underlying substrate at approximately such a point 120. If idler height is too low, track 20 might contact the substrate at a location forward of point 120, and if idler height is too high track 20 might contact the substrate at a location rearward of point 120. If, idler height is too high when track 20 is advanced with machine 10 to be positioned upon calibration support block 110, then opening fluid exchange valve 48 can enable idler 30 and idler support element 52 to settle under the force of gravity downward such that track 20 rests on calibration block 110. If idler height is too low in such an instance, then opening fluid exchange valve 48 can allow track roller frame 22 to settle under the force of gravity downward and thus cause idler 30 and idler support element 52 to be raised relative to track roller frame 22. In one implementation, calibration block 110 might be about 10 millimeters thick, however, the present disclosure is not thereby limited.

As explained above, performance such as grading performance and ride quality of a track-type tractor or certain other machines can depend substantially on an idler height to roller height relationship. This relationship changes over time due to wearing of the components. It will thus be appreciated that the present disclosure provides a much more easily adjusted system and a repeatable method than certain other strategies. In the illustrated embodiments, an operator or technician can manipulate an external handle 72 of fluid exchange valve 48 to allow grease to flow in conduit 46. In other instances, rather than a manually operated system, height monitoring or ride quality monitoring, or monitoring and analysis of other parameters, could be used in an electronically controlled system that would selectively electro-mechanically open and close a fluid exchange valve generally analogous to the manual operation discussed herein.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. An idler height adjustment system for an idler in an undercarriage system of a track-type machine comprising:
 a first piston assembly including a first piston movable in a first direction between an advanced position and a retracted position;
 a second piston assembly including a second piston movable in a second direction between an advanced position and a retracted position;
 a frame supporting the first piston assembly and the second piston assembly in opposition to one another, such that the first direction is opposite to the second direction, for positioning, respectively, above and below an idler support element in the undercarriage;
 a conduit connecting the first piston assembly to the second piston assembly; and
 a fluid exchange valve within the conduit and adjustable from a closed position, to an open position to exchange a flowable material through the conduit between the first piston assembly and the second piston assembly.

2. The system of claim 1 wherein the frame includes an upper arm in contact with the first piston assembly, a lower arm in contact with the second piston assembly, and a U-bend connecting the upper arm to the lower arm.

3. The system of claim 2 wherein the frame has a plurality of bolt holes formed therein for bolting the frame to a track roller frame in the undercarriage system.

4. The system of claim 2 wherein:
 the upper arm forms a first receptacle and the lower arm forms a second receptacle, and the first receptacle and the second receptacle receive, respectively, the first piston assembly and the second piston assembly; and
 the conduit extends through each of the upper arm and the lower arm to feed the flowable material to and from the first piston assembly and the second piston assembly.

5. The system of claim 1 wherein the fluid exchange valve includes a mechanically actuated valve having an external handle.

6. The system of claim 1 wherein the flowable material includes a grease filling the conduit, and wherein the system further includes a grease port at a location that is fluidly between the first piston and the second piston, and a closure blocking the grease port.

7. The system of claim 6 further comprising a first block-contact plate and a second block-contact plate, and wherein each of the first block-contact plate and the second block-contact plate include a horizontally oriented surface in a fixed pattern of contact with the corresponding one of the first piston and the second piston, and a vertically oriented guide surface having a sliding pattern of contact with the frame.

8. The system of claim 1 further comprising a first block-contact plate abutting the first piston and structured to contact an upper side of the idler support element, and a second block-contact plate in contact with the second piston and structured to contact a lower side of the idler support element.

9. The system of claim 1 wherein the conduit is a closed conduit.

10. An undercarriage system for a track-type machine comprising:
 an idler yoke;
 an idler support element coupled to the idler yoke and including an upper side facing an upward direction and a lower side facing a downward direction;
 a first piston assembly and a second piston assembly supported, respectively, at an upper location upon the upper side and a lower location upon the lower side of the idler support element and in opposition to one another;
 a conduit connecting the first piston assembly to the second piston assembly; and
 a fluid exchange valve within the conduit and adjustable from a closed position, to an open position to fluidly connect the first piston assembly and the second piston assembly.

11. The undercarriage system of claim 10 wherein the conduit is a closed conduit, and further including a grease filling the conduit.

12. The undercarriage system of claim 10 further comprising a track roller frame, and a support frame mounted to the track roller frame and supporting the first piston assembly and the second piston assembly at the upper location and the lower location.

13. The undercarriage system of claim 12 wherein the idler support element includes an idler support block trapped between the first piston assembly and the second piston assembly.

14. The undercarriage system of claim 13 wherein the first piston assembly and the second piston assembly are positioned at a first side of the track roller frame, and further comprising a third piston assembly, a fourth piston assembly, a second conduit connecting the third piston assembly to the fourth piston assembly, and a second fluid exchange valve within the second conduit, positioned at a second side of the track roller frame.

15. The undercarriage system of claim 12 wherein:
 the support frame includes an upper arm supporting the first piston assembly, and a lower arm supporting the second piston assembly; and
 the upper arm forms a first receptacle and the lower arm forms a second receptacle, and the first receptacle and the second receptacle receiving, respectively, the first piston assembly and the second piston assembly; and
 the conduit extends through each of the upper arm and the lower arm.

16. A method of adjusting a height of an idler in an undercarriage system of a track-type machine comprising:
 opening a fluid exchange valve in a conduit extending between a first piston assembly supported at an upper side of an idler support element in the undercarriage system, and a second piston assembly supported at a lower side of the idler support element;
 repositioning the idler support element relative to a track roller frame in the undercarriage system while the fluid exchange valve is open;
 covarying positions of pistons in the first piston assembly and the second piston assembly based on the repositioning of the idler support element;
 displacing a flowable material through the conduit based on the covarying of the positions of the pistons; and
 closing the fluid exchange valve to set the height of the idler after the displacement of the flowable material.

17. The method of claim 16 further comprising positioning a track in the undercarriage system upon a calibration block rested upon a substrate such that an axis of rotation of the idler is located vertically above the support block.

18. The method of claim 17 wherein the repositioning of the idler support element includes lowering the idler support block or lowering the track roller frame in the undercarriage system, toward the calibration block, under the force of gravity.

19. The method of claim 16 wherein the conduit is a closed conduit, and the displacing of the flowable material includes displacing a grease.

20. The method of claim 16 wherein the opening of the fluid exchange valve and the closing of the fluid exchange valve include adjusting the fluid exchange valve using an external handle.

* * * * *